United States Patent [19]
Ford

[11] Patent Number: 5,274,861
[45] Date of Patent: Jan. 4, 1994

[54] GRAY WATER RECYCLING SYSTEM

[75] Inventor: Ronald K. Ford, La Jolla, Calif.

[73] Assignees: Michael Bell, Encino; Melanie Chartoff, Los Angeles, both of Calif.

[21] Appl. No.: 990,130

[22] Filed: Dec. 14, 1992

Related U.S. Application Data

[62] Division of Ser. No. 739,821, Aug. 2, 1991, abandoned.

[51] Int. Cl.⁵ .............................................. A47K 4/00
[52] U.S. Cl. .................................. 4/665; 137/625.46; 137/625.47
[58] Field of Search ................... 4/546, 559, 597, 602, 4/603, 605, 665, 287; 137/625.46, 625.47

[56] References Cited

U.S. PATENT DOCUMENTS

| | | | |
|---|---|---|---|
| 1,894,407 | 1/1933 | Lutsky | 4/287 |
| 2,185,037 | 12/1939 | Powers | 4/287 X |
| 3,618,637 | 11/1971 | Santomieri | 137/625.47 |
| 4,162,218 | 7/1979 | McCormick | 4/665 X |
| 5,035,011 | 7/1991 | Rozenblatt et al. | 4/665 |
| 5,092,003 | 3/1992 | Weinberg | 4/665 X |
| 5,106,493 | 4/1992 | McIntosh | 4/665 X |

FOREIGN PATENT DOCUMENTS

| | | | |
|---|---|---|---|
| 2336744 | 2/1975 | Fed. Rep. of Germany | 4/665 |
| 0300427 | 12/1990 | Japan | 4/665 |

Primary Examiner—Charles E. Phillips
Attorney, Agent, or Firm—Pretty, Schroeder, Brueggemann & Clark

[57] ABSTRACT

A gray water recycling system directs gray water from a fixture to either a sewer line or a holding tank. The system includes a drain valve assembly that is controlled at the fixture and that selects between allowing water to flow into a drain pipe and then into the sewer line or allowing water to flow into a holding tank line to a pump and then into the holding tank. The drain valve assembly can be used with conventional fixtures such as sinks, tubs, and showers, using many standard fittings that are readily available. In an embodiment especially useful with sinks having a plug that is raised and lowered, the solid plug of a conventional sink is replaced with a hollow tube that communicates with the holding tank line. In another embodiment especially suited for showers and sinks with rotatable catch cups, the valve assembly includes two, nested valve bodies that rotate relative to each other to align valve body ports that alternately direct water into the sewer line or into the holding tank line.

3 Claims, 5 Drawing Sheets

GRAY WATER RECYCLING SYSTEM

This is a division of application Ser. No. 07/739,821, filed Aug. 2, 1991 now abandoned.

BACKGROUND OF THE INVENTION

1. Field of the Invention

This invention relates generally to gray water recycling systems and, more particularly, to valve assemblies for recycling systems that recirculate gray water from wash basins, tubs, and showers.

2. Description of the Related Art

Gray water is generally defined as water that is allowed to empty down the drain pipes of wash basins, tubs, and showers after being used for washing or rinsing, and that is ordinarily discarded and allowed to flow from the drain pipe into a sewer line. Thus, gray water from a sink or tub in a residence is lost to the resident after it flows down the drain. Because of water shortages and increasing demand for water, there is an increasing awareness of the need to conserve water and of the wastefulness of discarding gray water. As a result, gray water recycling systems are gaining favor.

Recycling systems divert gray water from being discarded and instead use the gray water for such non-critical uses as toilet tanks. Recycling systems typically filter the gray water and direct it via a pump to a holding tank that is elevated to create a sufficient head of pressure that the gray water can be used, for example, to operate a toilet tank water valve. After flushing, water from the toilet tank conventionally flows into the sewer line for treatment at a special facility. Such recycling systems can greatly decrease water consumption, but also can be quite complicated to install and difficult to retrofit to existing plumbing.

Contributing to the complexity and difficulty of installing gray water recycling systems is that, often, many non-standard plumbing fixtures and components are used and extensive modifications to existing plumbing are necessary. A gray water recycling system is more desirable and feasible if it can utilize as many existing, standard components as possible and if it requires minimal modification of existing plumbing. Many gray water recycling systems require complete renovation of plumbing with entirely new sinks, tubs, or toilets, or require complicated valve assemblies to direct water between gray water holding tanks and sewer lines. These requirements can be sufficiently expensive and time consuming to meet that they discourage efforts at recycling gray water.

Another problem encountered with typical recycling systems concerns control over the gray water. There might be occasions in which the water from a wash basin, tub, or shower should not be allowed to flow into a holding line. For example, if certain cleaning agents or dyes are being used, it might be preferable to allow the gray water to empty into the sewer line for proper treatment at a sewage treatment facility. Thus, it is advantageous to provide control over the flow of gray water at the wash basin, tub, or shower. It also is advantageous if a standard fixture can be used with as little modification as possible, to help reduce the cost and time to incorporate gray water recycling systems into new and existing construction.

From the foregoing discussion, it should be apparent that there is a need for a recycling system that can recycle gray water with a minimum modification to existing plumbing, using as many existing components as possible, without requiring replacement of entire fixtures. The present invention satisfies this need.

SUMMARY OF THE INVENTION

The present invention provides a gray water recycling system that can conveniently direct gray water from a fixture such as a wash basin, sink, tub, or shower to a holding tank or the like by replacing the fixture's existing drain pipe with a drain pipe valve assembly that is operable between a drain condition, in which water from the fixture is allowed to flow down the drain pipe into the sewer line, and a recycle condition, in which the water is blocked from flowing into the sewer line and instead is allowed to flow into a holding tank line and ultimately to the holding tank. A pump can be used to recirculate the gray water for non-critical uses. A drain pipe valve assembly in accordance with the invention allows the recycling system to divert water that ordinarily would be lost down a drain pipe, using standard fixtures currently installed or readily available, and requiring minimal modification to the existing plumbing.

One embodiment of the invention is adapted for use with a sink or tub fixture of the kind that includes a drain plug operable by a drain handle to move vertically up and down within the drain pipe of the fixture and allows water to either drain through a drain trap and into the sewer line or collect in the fixture. In this embodiment of the invention, the sink or tub is provided with a drain pipe having a hollow plug, or drain tube, that is operable by the drain handle to move up within the drain pipe to allow water to drain into the sewer line and to move down within the drain pipe to allow water to collect in the holding tank line. When the hollow drain tube is moved down into a recycle position that ordinarily corresponds to plugging the sink or tub, the water collects in the holding tank line, and back into the sink or tub, because a pump in the line downstream of the sink or tub blocks it. When the pump is operated, the collected water in the fixture is pumped to the holding tank and the sink or tub empties.

The hollow drain tube preferably communicates with the holding tank line via a downwardly extending pipe that projects out the bottom of the drain trap and communicates with the holding tank line and pump. Thus, the standard drain pipe and drain trap are replaced. When the hollow drain tube is raised to a drain position, water from the sink or tub flows into the drain pipe and into the sewer line, as is conventional The standard fixture and drain handle can be retained and the plumbing from the drain trap to the sewer line can be retained.

In an alternative embodiment of the invention, also suited for a bathroom sink or tub gray water recycling system, water flows into the hollow drain tube and then into a laterally-extending pipe that communicates with the holding tank line. A resilient boot in the drain pipe prevents leaks from occurring where the laterally extending pipe passes through the drain pipe. All components other than the drain tube can be retained, such as the sink or tub itself, the drain trap, and the drain operating handle In both cases, the drain valve assembly retains as many standard components as possible and thereby helps reduce the cost of fitting a gray water recycling system.

Alternative embodiments of the invention are adapted for use in a fixture not having a vertically movable drain plug, such as a shower or kitchen sink, which are typically provided with a rotatable catch cup assembly. In such cases, the existing drain pipe and flange are replaced by an assembly that includes two cup-shaped valve bodies that are nested, one inside the other. The inner valve body is movable between a drain condition, in which drain holes are exposed to allow water from the shower or kitchen sink to flow into the drain pipe and into the sewer line, and a recycle condition, in which the drain holes are covered and recycle holes are exposed to allow water from the shower or kitchen sink to flow into a holding tank line.

Whether the drain valve assembly with a hollow plug or the drain valve assembly with nested cups is used, the existing fixture can be retained For example, a standard bathroom sink can be used, replacing only the drain pipe and plug. Similarly, a standard kitchen sink or shower can be used, replacing only the catch cup assembly. The holding tank line and associated plumbing would be installed separately, as with any gray water recycling system. Thus, the cost of fitting a standard wash basin, sink, tub, or shower with a gray water recycling system is reduced and the process is simplified. Minimum modifications are required and existing components are used wherever possible.

Other features and advantages of the present invention should be apparent from the following description of the preferred embodiments, taken in conjunction with the accompanying drawings, which illustrate, by way of example, the principles of the invention.

BRIEF DESCRIPTION OF THE DRAWINGS

FIG. 2 is a cross-sectional view of a drain valve assembly in accordance with the present invention that can be used for fixtures having a moving drain plug, such as wash basins, sinks, or the like.

FIG. 5 and FIG. 6 are cross-sectional and plan views, respectively, of a drain valve assembly in accordance with the present invention for fixtures without a moving drain plug, such as tubs, showers, or the like.

DESCRIPTION OF THE PREFERRED EMBODIMENTS

Figure 1:
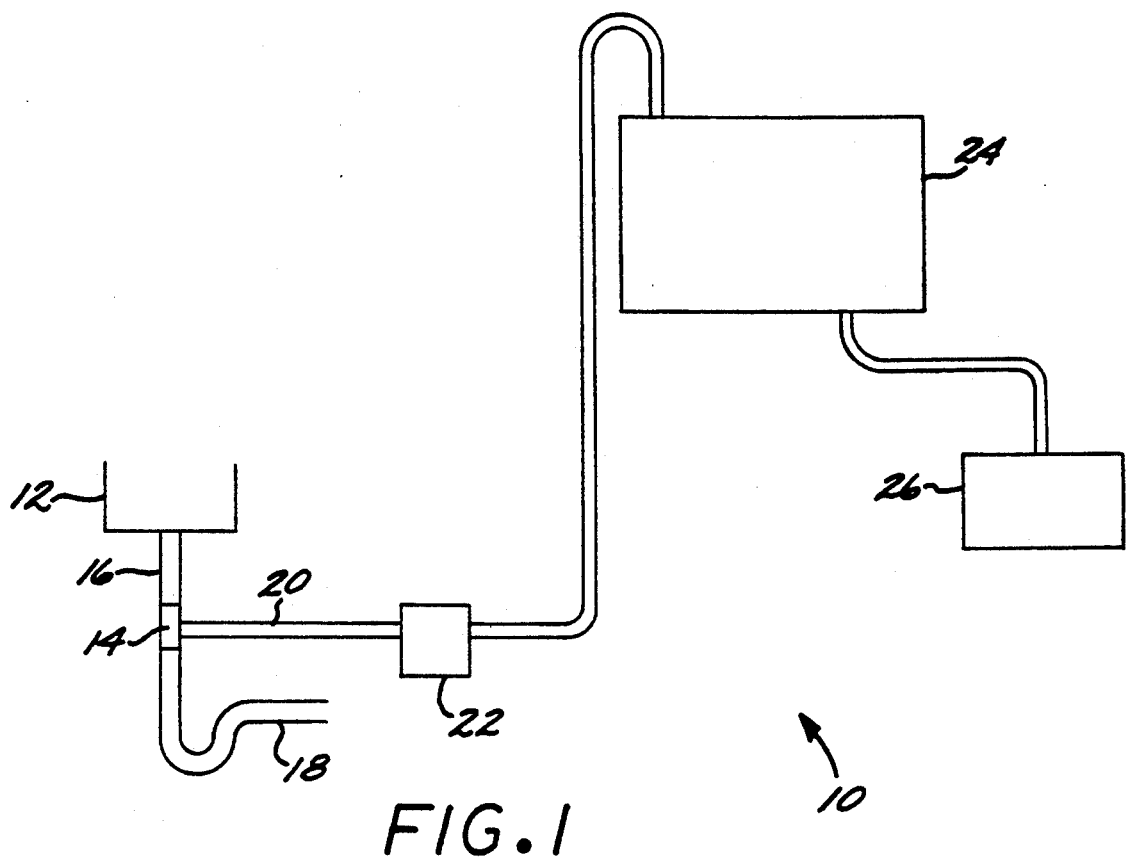
FIG. 1 is a schematic diagram of a gray water recycling system in accordance with the invention.

Referring to the drawings, and in particular to FIG. 1, a gray water recycling system 10 recycles gray water from a conventional sink 12, tub, shower, or the like by using a drain valve assembly 14 that directs such water down a drain pipe 16 and into a sewer line 18, or that instead directs such water to a holding tank line 20. A pump 22 in the holding tank line, when turned off, blocks the water from flowing further in the line and backs the water up into the sink or, when turned on, pumps the water to a holding tank 24 for recirculation in noncritical uses. The holding tank is preferably elevated at some distance above the sink 12 to provide a water pressure head sufficient to operate, for example, the fill valve of a toilet tank 26.

Figure 2:
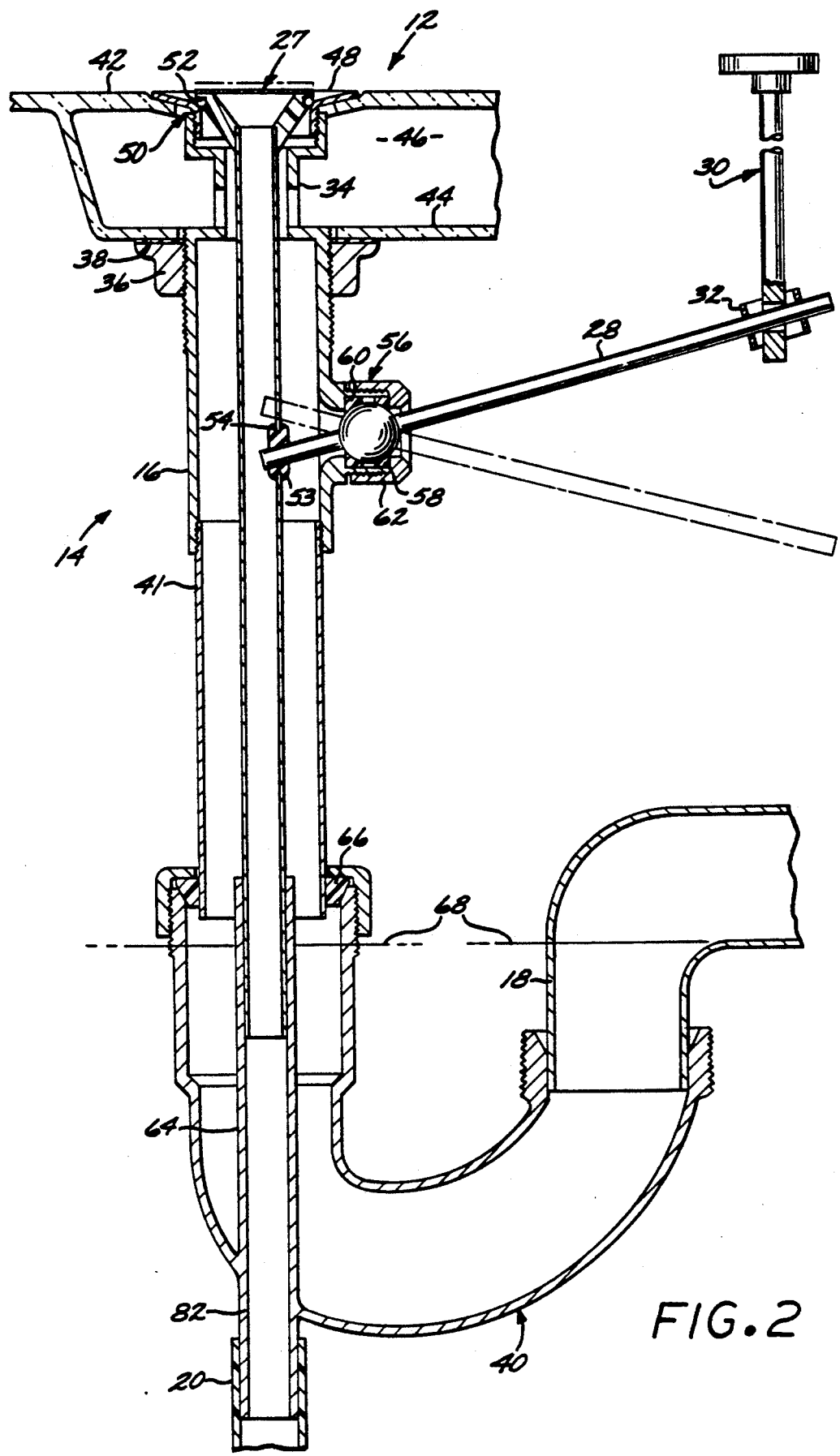

Referring to FIG. 2, the drain valve assembly 14, constructed in accordance with the present invention, replaces the standard drain assembly of the sink 12 and is operable between a drain condition, in which water from the sink is allowed to flow down the drain pipe 16 and into the sewer line 18, and a recycle condition, in which water from the sink is prevented from flowing into the sewer line and instead flows into the holding tank line 20. The drain valve assembly 14 includes a hollow drain tube 27 that replaces the solid drain plug ordinarily provided with a conventional drain assembly. A rocker arm 28 connected to a drain handle 30 by a sheet metal clip 32, which are components of a conventional drain valve assembly, operate the hollow drain tube 27 just as they otherwise would operate a conventional drain plug. The use of such conventional components reduces the cost and simplifies the process of fitting the sink 12 with a gray water recycling system.

The drain valve assembly 14 is fitted to the sink 12 and sewer line 18 using conventional fittings That is, the top end of the drain pipe 16 includes a conventional threaded drain fitting 34 that is coupled to the sink with a ring nut 36 and washer 38. The assembly is coupled to the sewer line by a drain trap 40. The drain pipe 16 preferably includes an intermediate tube portion 41 that is threaded to the bottom end of the drain pipe and that connects the drain pipe and the drain trap. The ring nut and washer are threaded over the drain fitting and clamp it relative to the sink 12. The sink includes a sink basin 42 that is provided with an overflow vent (not illustrated) and an inner wall 44 that defines an overflow chamber 46 extending between the vent and the threaded drain fitting 34 of the drain pipe 16. The drain fitting extends into the overflow chamber 46 and is fixed relative to the sink basin 42 by a conventional drain flange 48 that is screwed onto the top end of the fitting and seats in a drain opening 50 in the basin.

The rocker arm 28 and drain handle 30 ordinarily move between a plugged position, in which a conventional drain plug is lowered against the drain flange 48, and a drain position, in which the drain plug is raised. When the drain valve assembly 14 in accordance with the present invention is fitted, the drain plug is eliminated and is substituted by the hollow drain tube 27. The rocker arm 28 and drain handle 30 move the hollow drain tube between the recycle position, in which the drain tube is lowered against the drain flange, and the drain position, in which the drain tube is raised. In FIG. 2, the rocker arm and drain handle are shown in solid lines in the recycle position and are shown in dashed lines in the drain position.

More particularly, when the drain handle 30 is moved to the recycle position, the hollow drain tube 27 is lowered and the top end of the drain tube seats against the drain flange 48. An o-ring 52 around the underside of the hollow drain tube's top rim seals the drain tube against the drain flange and prevents water from flowing into the drain pipe 16 Water in the sink 12 is therefore constrained to flow into the hollow drain tube 27, where it then flows into the holding tank line 20 until it reaches the pump 22. Because the water is held in the line by the pump, the sink can be filled with water when the drain handle is in the recycle position. As a result, it is preferred that the pump 22 be located as close as possible to the sink, so that it is not necessary for an inordinate amount of water to be run into the drain tube and line before the sink begins to fill. As a practical matter, however, this is of no great concern, as the drain tube 27 and drain line 20 from the pump 22 to the sink typically contain less than approximately one-half cup of water.

If it is desired to drain the sink 12 after the drain tube 27 has been lowered against the drain flange 48, the pump 22 is turned on and the water in the sink and line 20 is pumped to the holding tank 24. Alternatively, the drain handle 30 can be moved to the drain position, which raises the top end of the drain tube 27 up from against the drain flange 48 and allows the water in the sink to drain to the sewer line 18 in a conventional manner, while the small amount of water in the drain tube remains there until the pump is operated.

The rocker arm 28 is coupled to the hollow drain tube 27 through a connecting hole 53 in the drain tube by a rubber grommet 54, which acts as a flexible coupling and also acts to seal against water leaks as water flows down the drain tube. The rocker arm pivots in a conventional rocker assembly 56 in which the rocker arm passes through a pivot ball 58 that is held against a socket fitting 60 by a ring nut 62. The rocker assembly 56 is of the conventional type that is supplied with sinks. Retaining these conventional components reduces the cost of incorporating the drain valve assembly 14.

The drain trap 40 is similar to a conventional trap except for a through tube 64 that is an integral part of the trap Preferably, the drain trap 40 and through tube 64 are molded in one piece from a high strength plastic. The through tube extends upwardly until it is approximately flush with the top edge 66 of the drain trap, above the level of water ordinarily in the trap, as indicated by the line 68 in FIG. 2. The through tube extends downwardly so that it projects from the bend in the drain trap, and is connected to the holding tank line 20, providing a water-tight seal for water to flow from the hollow drain tube 27 to the holding tank 24.

The lower end of the drain tube 27 extends straight down until it passes into the through tube 64 of the drain trap 40. The drain tube slides up and down within the through tube as the drain handle 30 is moved. Thus, the through tube channels water from the drain tube into the holding tank line 20 to the pump 22, and also guides the drain tube in its vertical movement.

Figure 3:
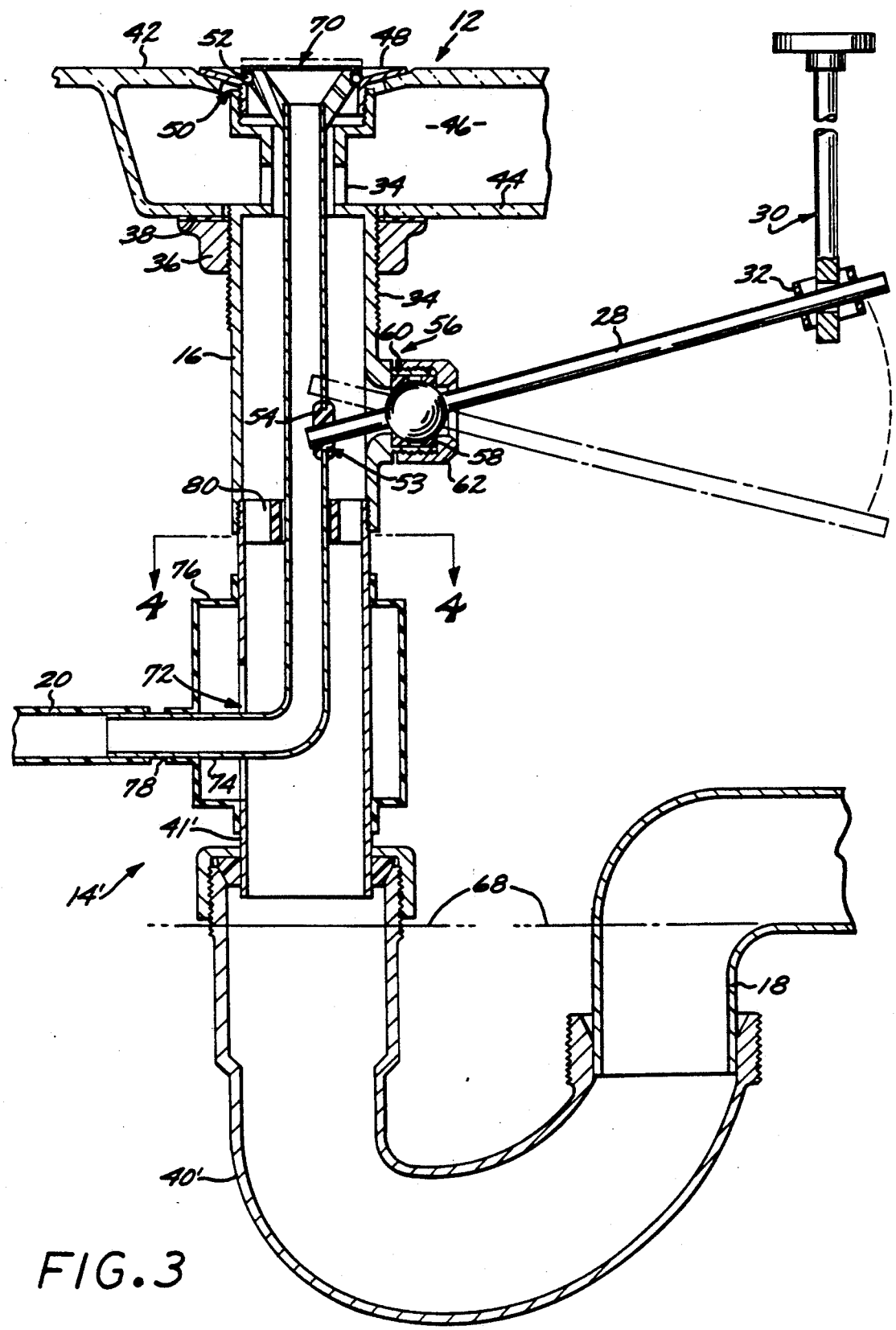
FIG. 3 is a cross-sectional view of a drain valve assembly that can be used in place of the assembly illustrated in FIG. 2.

FIG. 3 shows a sink in a gray water recycling system with another embodiment of a drain valve assembly 14' constructed in accordance with the present invention. Many of the same components shown in FIG. 2 can be used in this embodiment and are identified by the same reference numerals. Again, a hollow drain tube 70 moves vertically within a drain pipe 16 between a raised, drain position and a lowered, recycle position. The standard rocker arm 28 and drain handle 30 of the sink 12 can be retained, as can the rocker assembly 56. Again, the rocker arm is coupled to the hollow drain tube 70 at a hole 53 and is held in place by a grommet 54. In the FIG. 3 embodiment, however, the lower end of the hollow drain tube 70 turns from its downward length and projects laterally through a port 72, or slot, in the intermediate pipe 41' extending between the drain pipe 16 and the drain trap 40'. As the drain tube 70 is raised and lowered, its lower, laterally projecting end 74 is raised and lowered within the intermediate pipe slot 72. A flexible boot 76 surrounds the drain pipe 70 at the slot to prevent any flow of water from the inside of the drain pipe to the outside of the drain pipe This reduces the chance of leaks developing around the slot.

The flexible boot 76 prevents leaks because it is constructed from a closed-cell foam, such as polyurethane or polyethylene, and therefore will not absorb water. That is, the boot acts as a flexible shield over the intermediate tube slot 72. The boot has an annular shape, so as to fit over the intermediate pipe 41', and includes a lateral hole 78 that has a diameter slightly smaller than the diameter of the laterally projecting end 74 of the hollow drain tube 70. As the laterally projecting end of the tube is raised and lowered, the boot flexes around the lateral hole to accommodate the vertical movement. The laterally projecting end of the drain tube is connected to the holding tank line 20 so that the point at which the hollow drain tube projects through the intermediate pipe 41' is above the drain trap 40', which is ordinarily filled with water to the level indicated as the line 68. Because the slot 72 is above the trap, the chance of developing leaks is further reduced.

Figure 4:
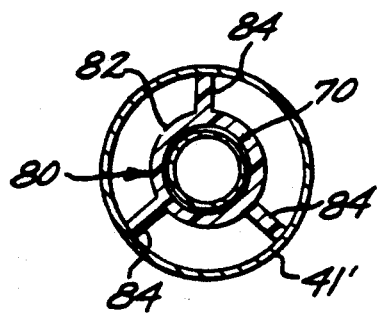
FIG. 4 is a cross-sectional view of a drain tube guide of the valve assembly illustrated in FIG. 3.

FIG. 4 shows a drain tube guide 80 that is used to keep the hollow drain tube 70 vertically aligned in the drain pipe 16. The drain tube guide fits inside the intermediate pipe 41' at its top edge and includes a cylindrical member 82 held in the axial center of the intermediate pipe by three support arms 84 that project outwardly from the cylindrical member to define a circle having a diameter approximately equal to the inside diameter of the intermediate pipe. The inside diameter of the cylindrical member is slightly larger than the outside diameter of the drain tube 70 to allow the tube to move up and down freely while being guided by the cylindrical member.

Figure 5:
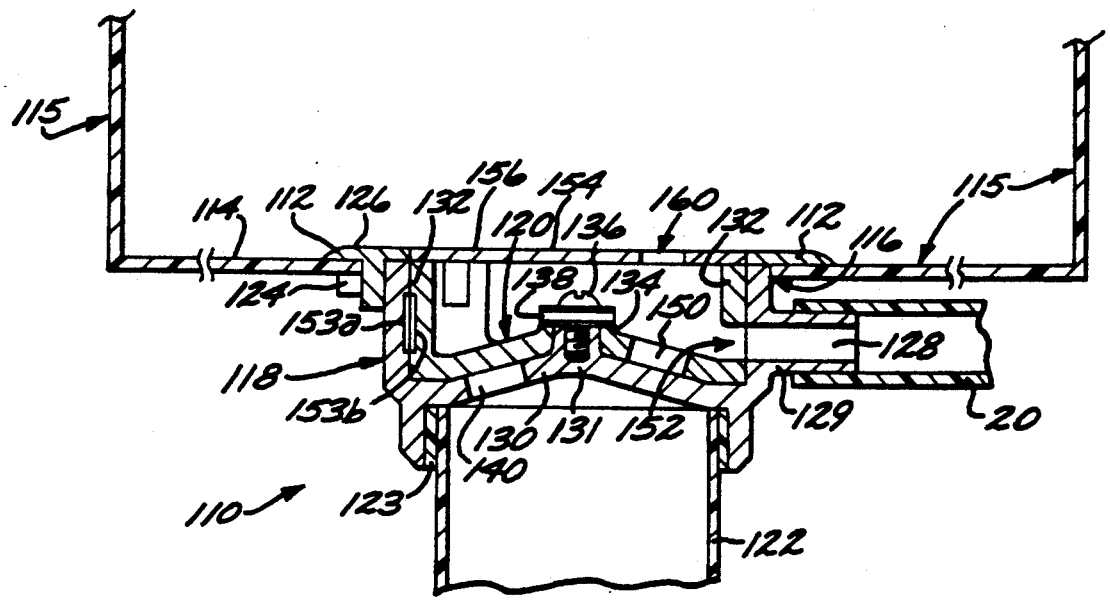
Figure 6:
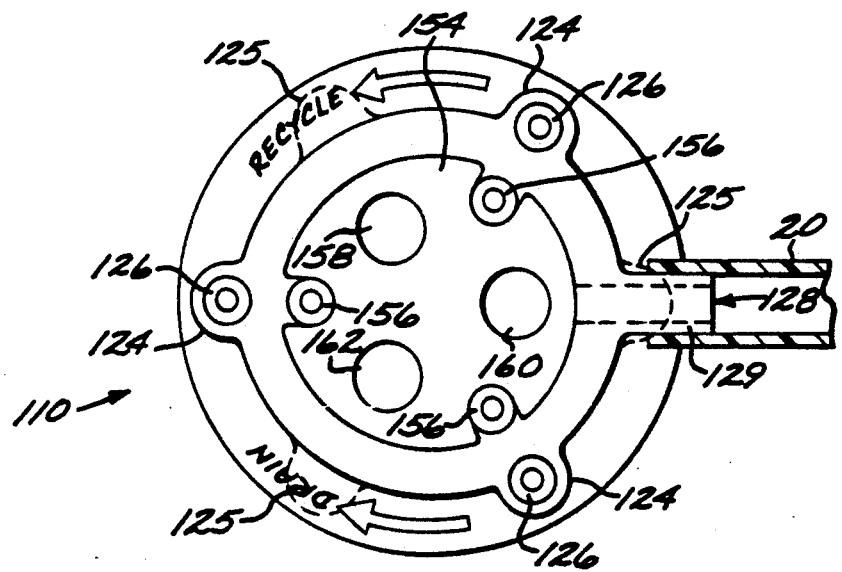

Some fixtures, in contrast to conventional bathroom sinks and the like, have no moving parts in their drain pipes These fixtures, such as showers and kitchen sinks, have drains that consist of a drain catch that is located in the drain opening of the fixture and is coupled to a drain pipe. To plug the drain opening so as to collect water in the fixture, a removable cup is seated in the drain catch. In accordance with the present invention, a drain valve assembly 110 such as illustrated in FIGS. 5 and 6 can be used for such fixtures.

The drain valve assembly 110 is especially suited for retro-fitting shower drains, where the underside of the shower floor is not easily reached, and includes a mounting flange 112 that seats against the floor 114 of the shower or sink 115 in the drain opening 116. The drain valve assembly includes a cup-shaped main body 118 that receives a cup-shaped rotatable body 120 that rotates relative to the main body between a drain position and a recycle position. The main body is coupled to the top end of a drain pipe 122 that is connected to a sewer line (not illustrated). Any misalignment or difference in diameter between the drain pipe and the main body 118 is accommodated by a standard, deformable drain adapter 123. Finally, the main body also is coupled to a holding tank line 20. As explained further below, the drain valve assembly 110 does not require access to the underside of the shower floor 114 to be mounted.

The main body 118 includes three ears 124 that project outwardly from the outside diameter of the main body and that are equally spaced around the circumference. To mount the drain valve assembly 110 in the floor 114 of a shower or sink 115, three angularly spaced notches are cut into the shower floor to align with the ears 124, as indicated by the dashed lines 125 in FIG. 6. Preferably, a template is provided for this purpose. Three holes are drilled through the shower floor 114, spaced approximately 60° apart in a circle, one hole located between each pair of the three notches, to receive mounting screws, as described further below. The ears of the main body are aligned with the notches 125 cut into the shower floor so that the main body can drop through the drain opening 116 of the floor and seat over the top of the drain pipe 122. The main body is then rotated through an angle of approximately 60° to move the ears beyond the notches and align the center of the ears with the three holes in the shower floor. The main body is then clamped into place against the mounting flange 112 by three flathead screws 126 that are screwed through the holes in the shower floor 114 and into the ears 124. The mounting flange covers and seals the three notches 125 cut into the shower floor 114.

A side port 128 projects from around a port opening 129 in a sidewall of the main body 118. The floor of the main body 118 includes a raised portion 130 with a central shaft 131 that projects upwardly. The rotatable body 120 includes vertical sidewalls 132 and a raised floor with a center shaft 134 such that the rotatable body fits within the main body and rotates. A round head machine screw 136 is threaded through the center of the main body and rotatable body, holding a plastic washer 138, to capture the rotatable body 120 and for smoother rotation.

The floor of the main body 118 includes three angularly-spaced drain openings 140. The floor of the rotatable body 122 includes three similar, angularly-spaced drain openings 150. The rotatable body can be rotated relative to the main body such that the floor drain openings in the main body and rotatable body are aligned, thereby allowing water flowing into the shower 115 to flow through the drain openings, into the drain pipe 122 and into the sewer line. A side port 152 is also included in the sidewall 132 of the rotatable body 120 such that, midway of the rotation between the aligned positions of the respective drain openings, the sidewall ports of the main body and rotatable body are aligned and the drain openings in the floor of the main body and rotatable body are not aligned When the side opening is aligned, water flowing into the shower or sink 115 drains through the aligned side port into the holding tank line 20 and into a holding tank or the like for recycling. Detents 153a are built into the main body 118 and ribs 153b are built into the rotatable cup 120 to provide positive stops for the aligned position, for better alignment with the respective ports.

A sheet metal, perforated strainer 154 is preferably attached to the rotatable body 120 by three flathead screws 156 similar to the ones used for attaching the main body to the floor of the shower. The strainer includes three finger holes 158, 160, and 162 through which a finger can be inserted to rotate the rotatable body relative to the main body 118 and select between the drain position and the recycle position. The strainer also provides a flat surface in the floor of the shower to prevent injuries to the feet and toes.

Figure 7:
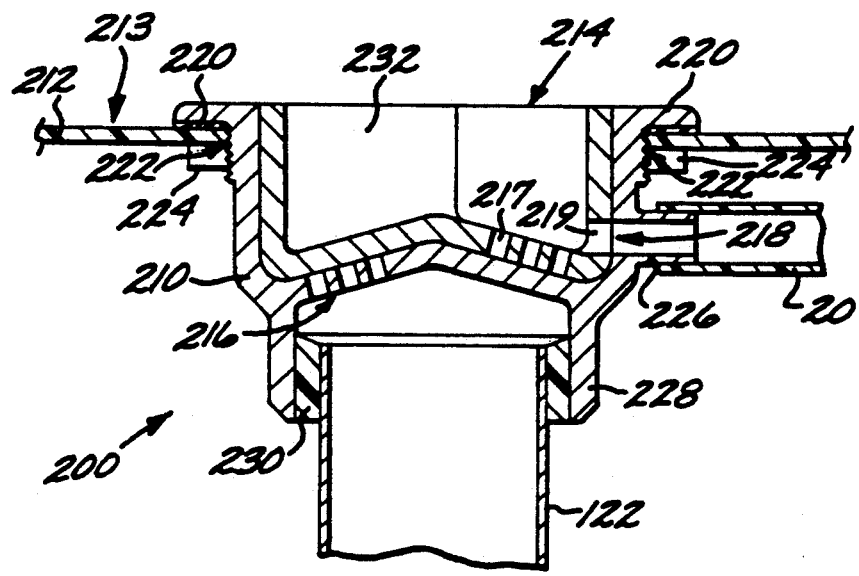
FIG. 7 and FIG. 8 are cross-sectional and plan views, respectively, of a drain valve assembly that can be used in place of the assembly illustrated in FIGS. 5 and 6.
Figure 8:
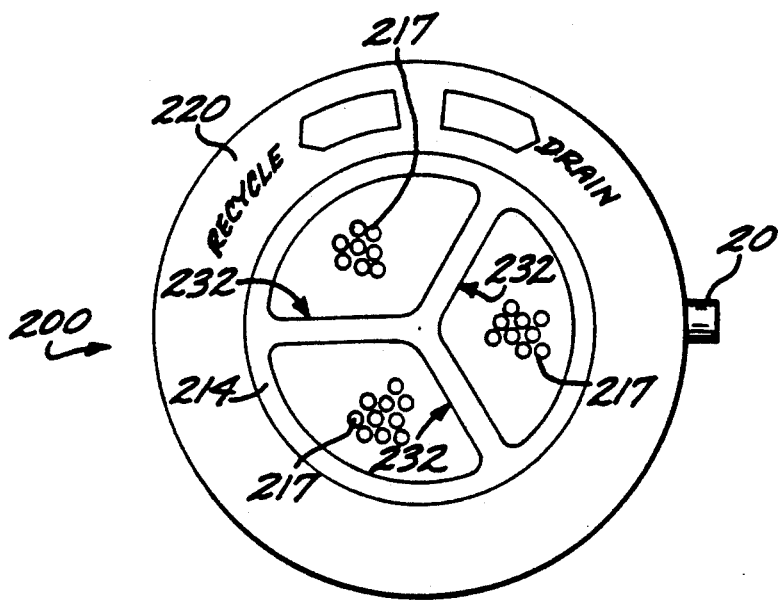

Another drain valve assembly 200 in accordance with the present invention is illustrated in FIGS. 7 and 8, and is especially suited for fixtures in which the underside of the fixture is easily reached, such as kitchen sinks. As with the drain valve assembly of FIGS. 5 and 6, this assembly again includes a main valve body 210, seated against the floor 212 of the fixture 213, and a rotatable body 214 that rotates relative to the main body to alternately align drain holes 216 in the floor of the main body with drain holes 217 in the rotatable body, and align a recycle port 218 in the wall of the main body with a recycle port 219 in the rotatable body. The valve assembly 200 again directs water down a drain pipe 122 or into a holding tank pump line 20. Although the embodiment shown in FIGS. 7 and 8 operates with the same principle as that illustrated in FIGS. 5 and 6, it offers a simpler construction because the underside of the sink floor is accessible. No notches need be cut into the sink, and the main body can be attached to the sink by a ring nut. The rotatable body 214 is removable, just as the drain cup in a conventional sink is removable. Built-in stops are provided by detents and ribs similar to those in the drain valve assembly 110 of FIGS. 5 and 6.

The one-piece main body 210 and the rotatable body 214 can be injection molded. Thus, the main body can include an integral mounting flange 220 that seats against the drain opening 222 of the sink. The outer circumference of the main body below the flange can be threaded to receive a ring nut 224 that thereby clamps the main body against the sink 212. The main body can be molded with the drain holes 216 in its floor and the port hole 218 in its sidewall A metal or plastic feed tube 226 can then be pressed into the side port hole to communicate with the holding tank line 20. A pump can be included in the drain line to direct water to a holding tank and to allow water to collect in the sink, as described above in connection with FIG. 1.

The main body 210 includes a downwardly projecting annular wall 228 that fits over the drain pipe 122. As with the prior embodiment, a standard deformable adapter 230 fits between the main body and the drain pipe to accommodate for any misalignment and for drain pipes of different diameters and to provide a secure seal. The floor of the rotatable body 214 can be provided with three vertical wall segments 232 that can be turned with moderate finger pressure to select between the drain position and the recycle position. Preferably, the rotatable body 214 is held in place by a friction fit, so it can be removed from the main body 210 by being snapped out. This makes it easier to clean the drain assembly, should it become necessary.

As described above, a gray water recycling system in accordance with the present invention includes a drain valve assembly that replaces a conventional fixture's drain assembly and that can be moved between a drain position and a recycle position. In the drain position, the drain valve assembly directs water from the fixture into the drain tube of the fixture and into a sewer line. In the recycle position, the drain valve assembly constrains the water to flow to a holding tank pump line that communicates with a holding tank or the like for recirculation and blocks water from flowing to the sewer line. In either case, a standard fixture can be used, with minimal modification to the plumbing that is in place.

The present invention has been described above in terms of presently preferred embodiments so that an understanding of the present invention can be conveyed. There are, however, many configurations for gray water recycling systems and drain valve assemblies that are not specifically described herein, but with which the present invention is applicable. The present invention should therefore not be seen as limited to the particular embodiments described herein, but rather, it should be understood that the present invention has applicability with respect to a wide variety of recycling systems and drain valve assemblies. All modifications, variations, or equivalent arrangements that are within the scope of the attached claims should therefore be considered to be within the scope of the invention.

I claim:

1. A gray water recycling system for directing gray water from a fixture to either a sewer line for disposal or to a holding tank for recycling, the system comprising:
   a drain flange that seats against the fixture;
   a drain pipe communicating with the drain flange and interconnecting the fixture and the sewer line;
   a holding tank line communicating with the drain flange and interconnecting the fixture and the holding tank;
   a pump that recirculates gray water from the holding tank for non-critical uses;
   a cup-shaped main body seated against the drain flange; and
   a cup-shaped rotatable body seated in the cup-shaped main body and selectively rotatable relative to the main body between a drain position and a recycle position, wherein, in the drain position, the rotatable body and the main body cooperate to allow water to flow from the fixture to the drain pipe and, in the recycle position, the rotatable body and the main body cooperate to allow water to flow from the fixture to the holding tank line and block water from flowing from the fixture into the drain pipe.

2. A drain valve assembly for use with a fixture that includes a drain opening that communicates with a drain pipe that directs water from the fixture to a sewer line and that communicates with a holding tank line that collects gray water for recycling, the assembly comprising:
   a cup-shaped main body that seats against the drain opening;
   a drain pipe that communicates with the cup-shaped main body, for directing water from the fixture's drain opening to the sewer line; and
   a cup-shaped rotatable body that seats in the cup-shaped main body and that is selectively rotatable within the main body between a drain position and a recycle position;
   wherein the cup-shaped rotatable body, in the drain position, allows water to flow from the main body into the drain pipe and, in the recycle position, directs water to flow from the main body into the holding tank line and blocks water from flowing into the drain pipe.

3. An assembly system as defined in claim 2, wherein:
   the cup-shaped main body includes at least one drain port in the bottom of the cup that communicates with the drain pipe and one recycle port in a side wall of the cup that communicates with the holding tank line; and
   the cup-shaped rotatable body includes at least one drain port in the bottom of the cup such that, when the rotatable body is in the drain position, the drain port in the rotatable body is aligned with the drain port in the main body, and further includes at least one recycle port in a side wall of the rotatable body that is aligned with the recycle port in the main body when the rotatable body is in the recycle position.

* * * * *